United States Patent [19]

Nishikubo et al.

[11] Patent Number: 5,371,142
[45] Date of Patent: Dec. 6, 1994

[54] THERMOPLASTIC RESIN COMPOSITION COMPRISING A POLYESTER, A POLYCARBONATE AND A COPOLYMER OF AN OLEFIN RUBBER

[75] Inventors: Yoshiaki Nishikubo; Ichiro Sato; Masahiro Shinohata, all of Osaka, Japan

[73] Assignee: Sumitomo Dow Limited, Osaka, Japan

[21] Appl. No.: 88,578

[22] Filed: Jul. 9, 1993

Related U.S. Application Data

[63] Continuation of Ser. No. 602,951, Oct. 25, 1990, abandoned.

[51] Int. Cl.$^5$ .............. C08L 51/04; C08G 63/48
[52] U.S. Cl. .............. 525/67; 525/64; 525/80; 525/81; 525/165; 525/148; 525/408
[58] Field of Search .............. 525/67, 286, 64; 528/80, 81, 165, 408, 148

[56] References Cited

U.S. PATENT DOCUMENTS

| | | | |
|---|---|---|---|
| 4,739,010 | 4/1988 | McKee et al. | 525/67 |
| 4,764,556 | 8/1988 | Lausberg et al. | 525/67 |
| 4,792,477 | 12/1988 | Ochiumi | 525/67 |
| 4,885,336 | 12/1989 | Boutni et al. | 525/67 |
| 4,916,185 | 4/1990 | Yates, III et al. | 525/67 |
| 5,008,342 | 4/1991 | Phadke | 525/64 |
| 5,021,504 | 6/1991 | Fujita et al. | 525/67 |
| 5,110,866 | 5/1992 | Hongo et al. | 525/67 |
| 5,112,913 | 5/1992 | Horiuchi et al. | 525/148 |
| 5,116,906 | 5/1992 | Mizuno et al. | 525/67 |
| 5,124,402 | 6/1992 | Laughner et al. | 525/67 |
| 5,151,460 | 9/1992 | Yates, III et al. | 525/67 |

FOREIGN PATENT DOCUMENTS

59-66448 4/1984 Japan.

*Primary Examiner*—John C. Bleutge
*Assistant Examiner*—Randy Gulakowski

[57] ABSTRACT

A thermoplastic resin composition comprising 1 to 300 parts by weight of a copolymer (A) which is obtainable by polymerizing 0.1 to 400 parts by weight of an unsaturated epoxy monomer and 0 to 1,000 parts by weight of other copolymerizable monomer in the presence of 100 parts by weight of an ethylene-α-olefin base rubber, and 100 parts by weight of a mixture comprising 90 to 10% by weight of a polycarbonate resin (B) and 10 to 90% by weight of a saturated polyester (C), which can give a molded article having improved balance among heat resistance, chemical resistance, impact resistance and a shrinkage factor; falling ball impact resistance; weld strength; and appearance.

7 Claims, No Drawings

THERMOPLASTIC RESIN COMPOSITION COMPRISING A POLYESTER, A POLYCARBONATE AND A COPOLYMER OF AN OLEFIN RUBBER

This application is a continuation of application Ser. No. 07/602,951, filed Oct. 25, 1990, now abn.

BACKGROUND OF THE INVENTION

1. Field of the Invention

The present invention relates to a thermoplastic resin composition which gives a molded article having improved balance among heat resistance, chemical resistance, impact resistance and a shrinkage factor; falling ball impact resistance; weld strength; and appearance.

2. Description of the Related Art

Polycarbonate resins have good heat resistance and impact strength and are used in many technical fields such as vehicles. However the polycarbonate resins have unsatisfactory chemical resistance and large dependency of the impact strength on a thickness of a molded article.

To improve the chemical resistance of the polycarbonate resin, it is proposed to blend the polycarbonate resin with a saturated polyester a typical example of which is polybutylene terephthalate. However, such blend deteriorates impact strength which is one of the characteristics of the polycarbonate resin and has an unsatisfactory shrinkage factor. In addition, the blend cannot improve the dependency of impact strength on the thickness.

Recently, various ternary resin compositions comprising a polycarbonate resin, a saturated polyester and a rubber or a copolymer. However, the ternary compositions do not have good balance among heat resistance, chemical resistance, impact strength and a shrinkage factor. In addition, since the ternary compositions comprises plural components, a molded article of the compositions has poor falling ball impact strength and weld strength.

SUMMARY OF THE INVENTION

An object of the present invention is to provide a thermoplastic resin composition comprising a polycarbonate resin, a saturated polyester and a specific copolymer from which an article having improved balance among heat resistance, chemical resistance, impact resistance and a shrinkage factor; falling ball impact resistance; weld strength; and appearance can be molded.

According to the present invention, there is provided a thermoplastic resin composition comprising 1 to 300 parts by weight of a copolymer (A) which is obtainable by polymerizing 0.1 to 400 parts by weight of an unsaturated epoxy monomer and 0 to 1,000 parts by weight of other copolymerizable monomer in the presence of 100 parts by weight of an ethylene-α-olefin base rubber, and 100 parts by weight of a mixture comprising 90 to 10% by weight of a polycarbonate resin (B) and 10 to 90% by weight of a saturated polyester (C).

DETAILED DESCRIPTION OF THE INVENTION

The thermoplastic resin composition of the present invention will be illustrated in detail.

The ethylene-α-olefin base rubber constituting the copolymer (A) includes a copolymer of ethylene with propylene or butene (EPR), a terpolymer of ethylene, propylene or butene and a non-conjugated diene (EPDM) and the like. These may be used independently or as a mixture thereof.

Examples of the non-conjugated diene contained in the terpolymer (EPDM) are dicyclopentadiene, ethylidene-norbornene, 1,4-hexadiene, 1,4-cyclobutadiene, 1,5-cyclooctadiene and the like.

In the copolymer (EPR) and the terpolymer (EPDM), a molar ratio of ethylene to propylene or butene is preferably from 5:1 to 1:3.

In the terpolymer (EPDM), the non-conjugated diene is contained in an amount corresponding to an iodine value of 2 to 50.

The unsaturated epoxy monomer constituting the copolymer (A) includes an unsaturated glycidyl ester of the formula:

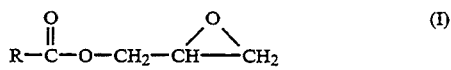

wherein R is a hydrocarbon group having a copolymerizable epoxide unsaturated bond, an unsaturated glycidyl ether of the formula:

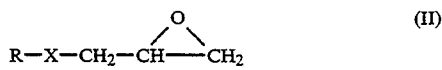

wherein R is the same as defined in the formula (I), and X is

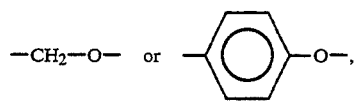

and an epoxyalkene of the formula:

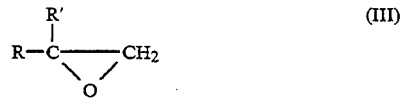

wherein R is the same as defined in the formula (I), and R' is hydrogen or methyl.

Specific examples of these epoxide monomers are glycidyl acrylate, glycidyl methacrylate, mono- and diglycidyl ester of itaconic acid, mono-, di- and triglycidyl ester of butenetricarboxylic acid, mono- and di-glycidyl ester of citraconic acid, mono- and di-glycidyl ester of endo-cis-bicyclo[2.2.1]hept-5-ene-2,3-dicarboxylic acid (trade name: Nadic acid), mono- and diglycidyl ester of endo-cis-bicyclo[2.2.1]hept-5-ene-2-methyl-2,3-dicarboxylic acid (trade name: Methylnadic acid), mono- and di-glycidyl ester of allylsuccinic acid, glycidyl ester of p-styrenecarboxylic acid, allylglycidyl ether, 2-methylallylglycidyl ether, styrene-p-glycidyl ether or p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1-hexene, vinylcyclohexene monoxide, and the like.

Other copolymerizable monomer constituting the copolymer (A) includes (i) aromatic vinyl compounds (e.g. styrene, α-methylstyrene, α-chlorostyrene, p-tert.-butylstyrene, p-methylstyrene, o-chlorostyrene, p-chlorostyrene, 2,5-dichlorostyrene, 3,4-dichlorostyrene, p-bromostyrene, o-bromo-styrene, 2,5-dibromostyrene, 3,4-dibromostyrene, cyanostyrene, 2-isopropenylnaphthalene, etc.), (ii) cyanated vinyl compounds (e.g. acrylonitrile, methacrylonitrile, maleonitrile, fumaronitrile, etc.), (iii) alkyl unsaturated carboxylates (e.g. methyl acrylate, ethyl acrylate, propyl acrylate, butyl acrylate, methyl methacrylate, ethyl methacrylate, butyl methacrylate, hydroxyethyl acrylate, hydroxyethyl methacrylate, hydroxypropyl methacrylate, etc.), (iv) unsaturated carboxylic acids (e.g. acrylic acid, methacrylic acid, etc.), (v) unsaturated dicarboxylic anhydrides (e.gmaleic anhydride, itaconic anhydride, citraconic anhydride, aconitic anhydride, hymic anhydride, etc.), (vi) maleimide compounds (e.g. maleimide, N-methylmaleimide, N-ethylmaleimide, N-butylmaleimide, N-laurylmaleimide, N-cyclohexylmaleimide, N-phenylmaleimide, N-o-chlorophenylmaleimide, etc.). One or more of them can be used. Among them, at least one compound selected from the group consisting of the aromatic vinyl compounds (i), the cyanated vinyl compounds (ii) and the alkyl unsaturated carboxylates (iii) is preferred.

The copolymer (A) is prepared by copolymerizing 0.1 to 400 parts by weight of the unsaturated epoxy monomer and 0 to 1,000 parts by weight of other copolymerizable monomer in the presence of 100 parts by weight of the ethylene-α-olefin base rubber.

When the amount of the unsaturated epoxy monomer is outside the range of 0.1 to 400 parts by weight, the impact strength and weld strength of the molded article are not improved.

When the amount of other copolymerizable monomer exceeds 1,000 parts by weight, the impact strength and weld strength of the molded article are not improved either.

In view of the impact strength and weld strength of the molded article, preferably 0.2 to 300 parts by weight of the unsaturated epoxy monomer and 10 to 500 parts by weight of other copolymerizable monomer are used per 100 parts by weight of the ethylene α-olefin base rubber.

As the polycarbonate resin (B), aromatic polycarbonates, aliphatic polycarbonates, aliphatic-aromatic polycarbonates and the like are exemplified.

Generally, the polycarbonate resin (B) is a polymer or a copolymer prepared from a hisphenol type compound such as 2,2-bis(4-oxyphenyl)alkanes, bis(4-oxyphenyl)ethers and bis(4-oxyphenyl)sulfones, sulfides or sulfoxides. For some end uses, polymers of halogen-substituted hisphenol type compounds may be used.

Preparation methods and kinds of polycarbonate resins are described, for example, in "Polycarbonate Resins" published by Daily Technology Newspaper Company (Nikkan Kogyo Shinbun-sha) (Sep. 30, 1969).

The saturated polyester (C) is an aromatic polyester which is obtainable by polymerizing an acid component comprising an aromatic dicarboxylic acid or its ester-forming derivative and a low molecular weight glycol having 2 to 10 carbon atoms or its ester-forming derivative. As an additional acid component, a small amount of at least one of aliphatic dicarboxylic acids having 2 to 32 carbon atoms, alicyclic dicarboxylic acids and their ester-forming derivatives may be used.

Specific examples of the aromatic dicarboxylic acid or its ester-forming derivative are terephthalic acid, isophthalic acid, naphthalene dicarboxylic acid, dibenzoic acid, alkali metal salts of dicarboxybenzenesulfonic acid and their lower alkyl esters, cycloalkyl esters, aryl esters, hydroxyalkyl esters and acid halides. They may be used independently or as a mixture.

Specific examples of the low molecular weight glycol having 2 to 10 carbon atoms are ethylene glycol, propylene glycol, tetramethylene glycol, pentamethylene glycol, hexamethylene glycol, decamethylene glycol, cyclohexane dimethanol, neopentyl glycol, diethylene glycol, 2,2-bis(4-hydroxyphenyl)propane, p-xylilene glycol and the like. They may be used independently or as a mixture.

Specific examples of the aliphatic dicarboxylic acid having 2 to 32 carbon atoms are adipic acid, sebacic acid, azelaic acid, dodecane dicarboxylic acid, cyclohexane dicarboxylic acid, dimeric acid and their lower alkyl esters, cycloalkyl esters, aryl esters, hydroxyalkyl esters and acid halides. They may be used independently or as a mixture.

Preferred examples of the saturated polyester (C) are polyethylene terephthalate, polytetrametylene terephthalate, polybutylene terephthalate and the like. The may be used independently or as a mixture.

The saturated polyester (C) may be prepared by a per se conventional method.

The thermoplastic resin composition of the present invention comprises 1 to 300 parts by weight of the copolymer (A) and 100 parts by weight of a mixture comprising 90 to 10% by weight of the polycarbonate resin (B) and 10 to 90% by weight of the saturated polyester (C).

When the amount of the copolymer (A) is less than 1 part by weight, the molded article has poor impact resistance. When the amount of the copolymer (A) exceeds 300 parts by weight, the molded article is poor in heat resistance, weld strength. In view of the balance among the physical properties, the copolymer (A) is used in an amount of 5 to 200 parts by weight per 100 parts of the mixture of the polycarbonate (B) and the saturated polyester (C).

When the amount of the polycarbonate resin (B) exceeds 90% by weight in the mixture of the polycarbonate (B) and the saturated polyester (C), the molded article has poor chemical resistance. When it is less than 10% by weight, the molded article has poor heat resistance and a large shrinkage factor. In view of chemical resistance, heat resistance and the shrinkage factor of the molded article, the weight ratio of the polycarbonate (B) to the saturated polyester (C) is from 80:20 to 20:80.

As mixing means, any of conventional mixing apparatuses such as a Banbury mixer, a single screw extruder and a twin screw extruder may be used. There is no limitation on a sequence of mixing the copolymer (A), the polycarbonate resin (B) and the saturated polyester (C). For example, all the three components are simultaneously mixed, or two of the components are premixed and them mixed with the other one.

If desired, the thermoplastic resin composition of the present invention may contain a dye, a pigment, an antioxidant, a plasticizer, an antistatic agent, an ultraviolet light absorbing agent, a lubricant, a filler, a flame retardant and the like. In addition, the composition of the present invention may contain other thermoplastic resins such as ABS resins, MBS resins, ABSM resins, AAS resins, ACS resins, polyvinyl chloride, ethylene-vinyl chloride copolymers, chlorinated polyethylene, ethylene-vinyl acetate copolymers, styrene-maleic anhydride copolymers, styrene-acrylonitrile-maleic anhydride copolymers, styrene-maleimide copolymers, styrene-acrylonitrile-maleimide copolymers, polyester elastomers, polyamide, polyacetal, polysulfone and the like.

PREFERRED EMBODIMENTS OF THE INVENTION

The present invention will be illustrated by following examples, which will not limit the scope of the present invention.

Examples 1-6 and Comparative Examples 1-6

A copolymer (A), a polycarbonate resin (B) and a saturated polyester were compounded in a ratio shown in Tables 1, 2 and 3 with a twin screw extruder to prepare each resin composition. Each composition was injection molded to produce a sample piece for measuring physical properties. The results are also shown in Tables 1, 2 and 3.

(1) Copolymer (A-1)

This copolymer was prepared by dissolving 100 parts by weight of EPDM having an iodine value of 8.5, a Mooney viscosity of 61 and a propylene content of 43% by weight and containing ethylidenenorbornene as a diene component in 1200 parts by weight of n-hexane and 800 parts by weight of ethylene dichloride, adding 20 parts by weight of glycidyl methacrylate and 0.4 part by weight of benzoyl peroxide and then effecting polymerization at 67° C. for 10 hours in a nitrogen atmosphere. The polymerization liquid was contacted with a large excess amount of methanol to precipitate the product, which was separated and dried to obtain the copolymer.

(2) Copolymer (A-2)

In the same manner as in (1) but dissolving 100 parts by weight of EPDM having an iodine value of 15.3, a Mooney viscosity of 67 and a propylene content of 50% by weight and containing ethylidenenorbornene as a diene component in 1250 parts by weight of n-hexane and 850 parts by weight of ethylene dichloride and adding 15 parts by weight of glycidyl methacrylate, 35 parts by weight of acrylonitrile, 100 parts by weight of styrene and 3 parts by weight of benzoyl peroxide, the copolymer was prepared.

(3) Copolymer (A-3)

In the same manner as in (2) but using glycidyl methacrylate, acrylonitrile, styrene and benzoyl peroxide in an amount of 8, 100, 250 and 8 parts by weight, respectively, the copolymer was prepared.

(4) Copolymer (a-1)

EPDM which is used in the preparation of the copolymer (A-1).

(5) Copolymer (a-2)

A polymer prepared by the same manner as (2) but using no glycidyl methacrylate.

(6) Polycarbonate resin (B)

A polycarbonate resin having a molecular weight of about 25,000 and comprising repeating units of the formula:

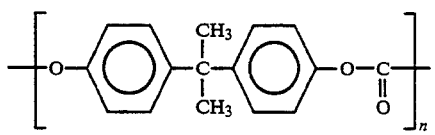

(7) Saturated polyester (c-1)
Polybutylene terephthalate
(8) Saturated polyester (c-2)
Polyethylene terephthalate.

TABLE 1

| Example No. | Com. 1 | Com. 2 | 1 | 2 | Com. 3 |
|---|---|---|---|---|---|
| Composition (wt. parts) | | | | | |
| (A) Copolymer | | | | | |
| A-1 | | 10 | 10 | | |
| A-2 | | | | 10 | |
| A-3 | | | | | |
| a-1 | | | | | |
| a-2 | | | | | 10 |
| (B) Polycarbonate resin | 50 | 5 | 30 | 50 | 50 |
| (C) Saturated polyester | | | | | |
| C-1 (PBT) | 50 | 95 | 70 | 50 | 50 |
| C-2 (PET) | | | | | |
| Physical properties | | | | | |
| Heat resistance (°C.) | 102 | 64 | 87 | 100 | 100 |
| Chemical resistance | O | O | O | O | O |
| Impact resistance (kg · cm/cm) | 8 | 14 | 60 | 74 | 55 |
| Molding shrinkage factor (%) | 0.7 | 2.1 | 1.1 | 0.7 | 0.7 |
| Falling ball impact strength (kg/cm) | >600 | >600 | >600 | >600 | >600 |
| Weld strength (kg · cm) | 120 | 150 | 220 | 300 | 60 |

TABLE 2

| Example No. | 3 | Com. 4 | 4 | Com. 5 | 5 |
|---|---|---|---|---|---|
| Composition (wt. parts) | | | | | |
| (A) Copolymer | | | | | |
| A-1 | | 30 | | | |
| A-2 | | | 10 | 10 | |
| A-3 | | | | | 10 |
| a-1 | 30 | | | | |
| a-2 | | | | | 10 |
| (B) Polycarbonate resin | 50 | 50 | 70 | 95 | 70 |
| (C) Saturated polyester | | | | | |
| C-1 (PBT) | 50 | 50 | 30 | 5 | 30 |
| C-2 (PET) | | | | | |
| Physical properties | | | | | |
| Heat resistance (°C.) | 86 | 76 | 111 | 123 | 106 |
| Chemical resistance | O | O | O | X | O |
| Impact resistance (kg · cm/cm) | 78 | 6 | 77 | 64 | 37 |
| Molding shrinkage factor (%) | 0.9 | 1.4 | 0.6 | 0.5 | 0.7 |
| Falling ball impact strength (kg/cm) | >600 | <100 | >600 | >600 | 500 |
| Weld strength (kg · cm) | 270 | <10 | 240 | 210 | 150 |

TABLE 3

| Example No. | 6 | 7 | Com. 6 |
|---|---|---|---|
| Composition (wt. parts) | | | |

TABLE 3-continued

| Example No. | 6 | 7 | Com. 6 |
|---|---|---|---|
| (A) Copolymer | | | |
| A-1 | | | |
| A-2 | | | |
| A-3 | 40 | 40 | 200 |
| a-1 | | | |
| a-2 | | | |
| (B) Polycarbonate resin | 30 | 50 | 50 |
| (C) Saturated polyester | | | |
| C-1 (PBT) | 50 | 50 | 50 |
| C-2 (PET) | 20 | | |
| Physical properties | | | |
| Heat resistance (°C.) | 91 | 101 | 92 |
| Chemical resistance | O | O | X |
| Impact resistance (kg·cm/cm) | 67 | 77 | 12 |
| Molding shrinkage factor (%) | 0.6 | 0.5 | 0.5 |
| Falling ball impact strength (kg/cm) | >600 | >600 | 150 |
| Weld strength (kg·cm) | 240 | 300 | <10 |

The physical properties are measured as follows:

Heat resistance

According to ASTM D-648. ¼ inch, 264 psi, no anneal.

Impact strength

According to ASTM D-256 ¼ inch, 23° C.

Molding shrinkage factor

Calculated from a difference between a size of the ASTM No. 1 dumbbell mold and a size of a molded dumbbell piece.

Weld strength

A resin melt (270° C.) was injected from two gates (each 4.0×2.5 nun) with a distance of 40 mm to form a test piece of 3 mm in thickness, 60 mm in length and 60 mm in width.

The test piece was placed on a jig having a height of 80 mm, an inner diameter of 45 mm and an outer diameter of 50 mm.

In a low temperature room kept at −30° C., a steel ball of 1 kg was fallen onto a center of the test piece from a height of 10 to 120 cm (every 10 cm, using five test pieces at each height) and the maximum energy (kg.cm) with which all five test pieces were not broken was recorded.

Falling ball impact strength

The same setup used in the measurement of weld strength was used. A test piece was molded with one gate, and the maximum energy (kg.cm) was measured in the same manner as in the measurement of weld strength except that a steel ball of 5 kg was used.

Chemical resistance

Flexural stress was applied on a 1/8 inch test peace according to ASTM D-648 and a wax cleaner (MC-21 manufactured by BEL-RAY). After 48 hours, the presence of breakage was observed. In Tables, "O" indicates "no breakage" and "X" indicates "breakage."

What is claimed is:

1. A thermoplastic resin composition consisting essentially of
   1 to 300 parts by weight of a copolymer (A) which is obtained by polymerizing 0.1 to 400 parts by weight of an unsaturated epoxy monomer and 10 to 500 parts by weight of at least one other copolymerizable monomer selected from the group consisting of aromatic vinyl compounds and cyanated vinyl compounds, in the presence of 100 parts by weight of an ethylene-α-olefin base rubber, and
   100 parts by weight of a mixture comprising 90 to 10% by weight of a polycarbonate resin (B) and 10 to 90% by weight of a saturated polyester (C).

2. The thermoplastic resin composition according to claim 1, which comprises 5 to 200 parts by weight of said copolymer (A) and 100 parts by weight of said mixture.

3. The thermoplastic resin composition according to claim 1, wherein said mixture comprises 20 to 80% by weight of said polycarbonate resin (B) and 80 to 20% by weight of said saturated polyester (C).

4. The thermoplastic resin composition according to claim 1, wherein said polycarbonate resin (B) is at least one selected from the group consisting of 2,2-bis(4-oxyphenyl)alkanes, bis(4-oxyphenyl)ethers and bis(4-oxyphenyl)sulfones, sulfides and sulfoxides.

5. The thermoplastic resin composition according to claim 4, wherein the unsaturated epoxy monomer for component (A) is glycidyl methacrylate and wherein component (C) is selected from the group consisting of polybutylene terephthalate and polyethylene terephthalate.

6. The thermoplastic resin composition according to claim 1, wherein the unsaturated epoxy monomer for component (A) is glycidyl methacrylate.

7. The thermoplastic resin composition according to claim 1 wherein the ethylene-alpha-olefin base rubber is selected from the group consisting of a copolymer of ethylene with propylene or butene and a terpolymer of ethylene, propylene or butene and a nonconjugated diene and mixtures thereof.

* * * * *